(12) United States Patent
Iwai et al.

(10) Patent No.: US 11,653,255 B2
(45) Date of Patent: *May 16, 2023

(54) APPARATUS AND METHOD FOR COMMUNICATION NETWORK

(71) Applicant: NEC Corporation, Tokyo (JP)

(72) Inventors: Takanori Iwai, Tokyo (JP); Nobuhiko Itoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,566

(22) Filed: Jun. 14, 2022

(65) Prior Publication Data

US 2022/0312259 A1    Sep. 29, 2022

Related U.S. Application Data

(63) Continuation of application No. 16/491,968, filed as application No. PCT/JP2017/045068 on Dec. 15, 2017, now Pat. No. 11,388,620.

(30) Foreign Application Priority Data

Mar. 8, 2017    (JP) .............................. JP2017-044323

(51) Int. Cl.
*H04W 28/02*    (2009.01)
*H04W 24/08*    (2009.01)

(52) U.S. Cl.
CPC ....... *H04W 28/0268* (2013.01); *H04W 24/08* (2013.01)

(58) Field of Classification Search
CPC . H04W 28/0268; H04W 24/08; H04W 24/02; H04W 28/24; H04L 47/28; H04L 12/28; H04L 47/24; H04L 47/805
See application file for complete search history.

(56) References Cited

U.S. PATENT DOCUMENTS

2014/0249653 A1*  9/2014  Blevins ................ G05B 19/058
                                                                        700/21
2018/0351361 A1* 12/2018  Miyake .................... H02J 3/00

FOREIGN PATENT DOCUMENTS

JP          H07-321787 A      12/1995
JP          2005-354280 A     12/2005
(Continued)

OTHER PUBLICATIONS

"The Tactile Internet", ITU-T Technology Watch Report, Aug. 2014, 24 pgs.

(Continued)

*Primary Examiner* — Ayanah S George

(74) *Attorney, Agent, or Firm* — Sughrue Mion, PLLC

(57) ABSTRACT

A control apparatus (40) determines a control value to be supplied to a node (604) in a communication network so as to achieve a setpoint of Quality of Service (QoS) performance required by a traffic flow transferred through the communication network. This control value causes the node (604) to adjust allocation of network resources to the traffic flow. The control apparatus (40) corrects the control value to be supplied to the node (604) on the basis of a control delay between the control apparatus (40) and the node (604) and on the basis of a trend in changes in a traffic-related parameter. It is thus, for example, possible to contribute to stabilizing control for guaranteeing QoS performance required by a traffic flow even when there is a non-negligible control delay.

16 Claims, 8 Drawing Sheets

(56) References Cited

FOREIGN PATENT DOCUMENTS

| | | | |
|---|---|---|---|
| JP | 2008-124748 | A | 5/2008 |
| JP | 2012-15668 | A | 1/2012 |
| JP | 2014-197391 | A | 10/2014 |
| WO | 2015/132429 | A1 | 8/2016 |
| WO | WO-2016132429 | A1 * | 8/2016 |
| WO | 2016/157753 | A1 | 10/2016 |

OTHER PUBLICATIONS

International Search Report for PCT/JP2017/045068 dated Mar. 13, 2018.

JP Office Action for JP Application No. 2021-198235, dated Oct. 11, 2022 with English Translation.

* cited by examiner

APPARATUS AND METHOD FOR COMMUNICATION NETWORK

CROSS-REFERENCE TO RELATED APPLICATIONS

The present application is a continuation application of U.S. patent application Ser. No. 16/491,968 filed on Sep. 6, 2019, which is a National Stage Entry of international application PCT/JP2017/045068 filed on Dec. 15, 2017, which claims the benefit of priority from Japanese Patent Application No. 2017-044323 filed on Mar. 8, 2017, the disclosures of all of which are incorporated in their entirety by reference herein.

TECHNICAL FIELD

The present disclosure relates to control over a communication network and, in particular, to control of a node in a communication network for achieving a target value (setpoint) required by a traffic flow transferred through the communication network.

BACKGROUND ART

Providing ultra-low latency services through a radio communication network has been studied. Ultra-low latency services may include mission critical communications. For example, the 3rd Generation Partnership Project (3GPP) has started to work on the standardization for the fifth generation mobile communication system (5G), i.e., 3GPP Release 14, in 2016 to make it a commercial reality in 2020. The requirements for the 5G system architecture include support of mission critical communications.

Ultra-low latency services or mission critical communications include, for example, intelligent transport systems, industrial automation, robotics, the haptic or tactile internet, virtual reality, and augmented reality. The ultra-low latency services and mission critical communications require end-to-end latency in the order of milliseconds. For example, Non-patent Literature 1 describes that 1-millisecond end-to-end latency is required in tactile internet applications.

Ultra-low latency services and mission critical communications also require reliability. The term "reliability" means a capability of guaranteeing message transmission within a defined end-to-end latency (i.e., a delay budget, e.g., 1 millisecond).

CITATION LIST

Patent Literature

Patent Literature 1: JP 2014-197391 A
Patent Literature 2: JP 2008-124748 A
Patent Literature 3: WO 2016/157753 A1

Non Patent Literature

Non-patent Literature 1: ITU-T Technology Watch Report (August 2014)—The Tactile Internet, [retrieved on 2017-02-27], <URL: http://www.itu.int/oth/T2301000023/en>

SUMMARY OF INVENTION

Technical Problem

The inventors have studied control over a communication network for achieving a target value (or setpoint) of Quality of Service (QoS) (e.g., end-to-end latency) required by a traffic flow transferred through the communication network. In some implementations, a control apparatus performs feedback control as described below. The control apparatus acquires a measured value of QoS performance related to a traffic flow transferred through a communications network and compares the measured value with a target value (or setpoint) of the QoS performance. Then, the control apparatus determines a control value to be supplied to a node in the communication network to achieve the setpoint is achieved.

However, it should be noted that such feedback control is affected by a change in a traffic-related parameter regarding the traffic flow. The traffic-related parameter is a parameter that affects the determination of the control value for achieving the setpoint.

As an example, consider control for guaranteeing end-to-end latency required by a traffic flow transferred on a communication path between two end nodes, such as a sensor and an actuator (hereinafter referred to as an end-to-end path). In this control, the setpoint of the feedback control may be, for example, end-to-end latency, end-to-end throughput, or an acceptable delay for the communication network. The control value for the feedback control may be guaranteed QoS for the traffic flow, for example at least one of a priority, a guaranteed delay, and a guaranteed bit rate. The traffic-related parameter may be, for example, the size of data to be sent in one communication event that the end-to-end latency is guaranteed. Additionally or alternatively, the traffic-related parameter may include at least one of a data rate per communication event and an interval between communications in a communication event. The traffic-related parameter may be another parameter that relates to the pattern of the traffic flow and changes as the transmission data size or the data rate between the end nodes changes.

As an example, when image data or video data is transmitted between the end nodes, the data size and data rate per communication event changes depending on the change in the image resolution or the frame rate. Alternatively, when a set of feature vectors regarding feature points (local features) extracted from an image is transmitted between the end nodes, the data size and data rate per communication event changes depending on the change in the number of feature points extracted from the image. It is desirable that the control apparatus is able to ensure the defined end-to-end latency even when the traffic-related parameter (e.g., the data size per communication event) changes.

It should be also noted that such feedback control is affected by a control delay. As the control delay between the control apparatus and the nodes increases, the feedback control becomes more difficult. In particular, when the control delay is longer than the interval at which changes in the traffic-related parameter occur, it is difficult to stabilize the control for guaranteeing the QoS performance required by the traffic flow.

Incidentally, Patent Literature 1 discloses feedback control for controlling a process through a radio communication network. Patent Literature 2 discloses control of a node through a network (e.g., an Internet Protocol (IP) network). Specifically, in Patent Literature 2, a control apparatus estimates a current process value while taking into account a delay in the network, and generates a control output based on the estimated process value. Patent Literature 3 discloses that a Service Capability Exposure Function (SCEF) receives communication pattern information from an application-layer entity and sends s network parameter derived from the communication pattern information to a network entity. However, Patent Literature 1, Patent Literature 2, or Patent Literature 3 does not explicitly disclose how to compensate for the above-described change in the traffic-related parameter when there is a control delay.

One of the objects to be attained by embodiments disclosed herein is to provide an apparatus, a method, and a program that contribute to stabilizing control for guaranteeing QoS performance required by a traffic flow transferred through a communication network even when there is a non-negligible control delay. It should be noted that the above-described object is merely one of the objects to be attained by the embodiments disclosed herein. Other objects or problems and novel features will be made apparent from the following description and the accompanying drawings.

Solution to Problem

In a first aspect, a control apparatus includes a memory, and at least one processor coupled to the memory and configured to execute a plurality of modules. The modules include a control module, a monitoring module, an acquisition module, and a correction module. The control module is configured to determine a control value to be supplied to a node in a communication network so as to achieve a target value (or setpoint) of Quality of Service (QoS) performance required by a traffic flow transferred through the communication network. The control value causes the node to adjust allocation of network resources to the traffic flow. The monitoring module is configured to monitor a traffic-related parameter regarding the traffic flow. The acquisition module is configured to acquire a control delay between the control apparatus and the node. The correction module is configured to correct the control value based on the control delay and on a trend in changes in the traffic-related parameter.

In a second aspect, a method performed by a control apparatus, includes:
(a) determining a control value to be supplied to a node in a communication network so as to achieve a target value (or setpoint) of Quality of Service (QoS) performance required by a traffic flow transferred through the communication network, the control value causing the node to adjust allocation of network resources to the traffic flow;
(b) monitoring a traffic-related parameter regarding the traffic flow;
(c) acquiring a control delay between the control apparatus and the node; and
(d) correcting the control value based on the control delay and on a trend in changes in the traffic-related parameter.

In a third aspect, a program includes a set of instructions (software codes) that, when loaded into a computer, causes the computer to perform a method according to the above-described second aspect.

Advantageous Effects of Invention

According to the above-described aspects, it is possible to provide an apparatus, a method, and a program that contribute to stabilizing control for guaranteeing QoS performance required by a traffic flow transferred through a communication network even when there is a non-negligible control delay.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

First Embodiment

Figure 1:
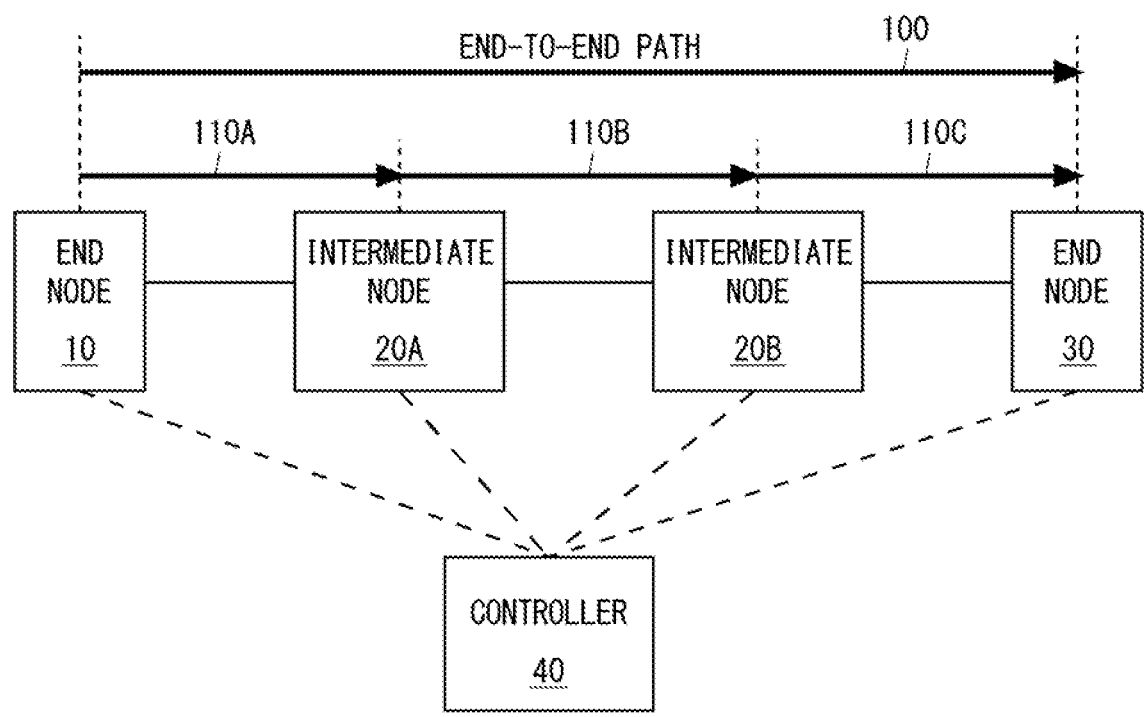
FIG. 1 shows a configuration example of a communication network according to a first embodiment.

FIG. 1 shows a configuration example of a communication network according to some embodiments including this embodiment. In the example shown in FIG. 1, the communication network includes an end node 10, intermediate nodes 20A and 20B, and an end node 30. An end-to-end path 100 is a communication path from the end node 10 to the end node 30. The end node 10 may be referred to as a sender end node while the end node 30 may be referred to as a receiver end node.

In the cases of the tactile internet and industrial automation, the end node 10 may be a computer installed in a sensor and the end node 30 may be a computer installed in an actuator. In the case of an Intelligent Transportation System (ITS), both of the end nodes 10 and 30 may be computers installed in automobiles. Alternatively, one of the end nodes 10 and 30 may be a computer installed in an automobile while the other end node may be an ITS application server.

The end-to-end path 100 is composed of two or more path segments 110. Accordingly, the end-to-end path 100 includes at least one intermediate node 20. In the example shown in FIG. 1, the end-to-end path 100 is divided into three path segments 110A, 110B and 110C. The path segment 110A is a communication path from the (sender) end node 10 to the intermediate node 20A. The path segment 110B is a communication path from the intermediate node 20A to the intermediate node 20B. The path segment 110C is a communication path from the intermediate node 20B to the (receiver) end node 30.

The end-to-end path 100 is a communication path in the application layer and transfers application-layer messages. In other words, the end-to-end path 100 transfers an application-layer traffic flow. Both of the end nodes 10 and 30 support an application-layer protocol and process application-layer messages. The traffic flow may also be referred to as a packet flow or a data flow.

Further, at least one intermediate node 20 may support the application-layer protocol and process application-layer messages. That is, a communication event (or a communication transaction) that is performed on the end-to-end path 100 may include two or more application-layer communications.

For example, in the above-described case of the haptic internet and industrial automation, at least one intermediate node 20 may be a control/steering server that controls the actuator (i.e., the end node 30) on the basis of sensing data received from the sensor (i.e., the end node 10). In the case of the Intelligent Transportation System (ITS), at least one intermediate node 20 may be an ITS server that receives a message or data from an automobile (i.e., the end node 10) and controls the automobile or another automobile (i.e., the end node 30).

Additionally or alternatively, some or all of the one or more intermediate nodes 20 may support the network layer (i.e., Layer 3, e.g., the Internet Protocol (IP) layer) and transfer a packet(s) containing an application-layer message between the end nodes 10 and 30. For example, each intermediate node 20 may be an IP router or a gateway.

Additionally or alternatively, at least one intermediate node 20 may be a RAN node (e.g., base station, eNodeB, or Radio Network Controller (RNC)) that communicates with the end node 10 or 30 through an air interface.

FIGS. 2 to 5 show several specific examples of the end-to-end path 100. In the examples shown in FIGS. 2-5, the end-to-end path 100 includes a radio communication network (i.e., a Radio Access Network (RAN), or a RAN and a core network). In the example shown in FIG. 2, the end-to-end path 100 is a communication path from a radio terminal (User Equipment (UE)) 210 to an application server 270. Accordingly, the UE 210 corresponds to the (sender) end node 10 and the application server 270 corresponds to the (receiver) end node 30.

Figure 2:
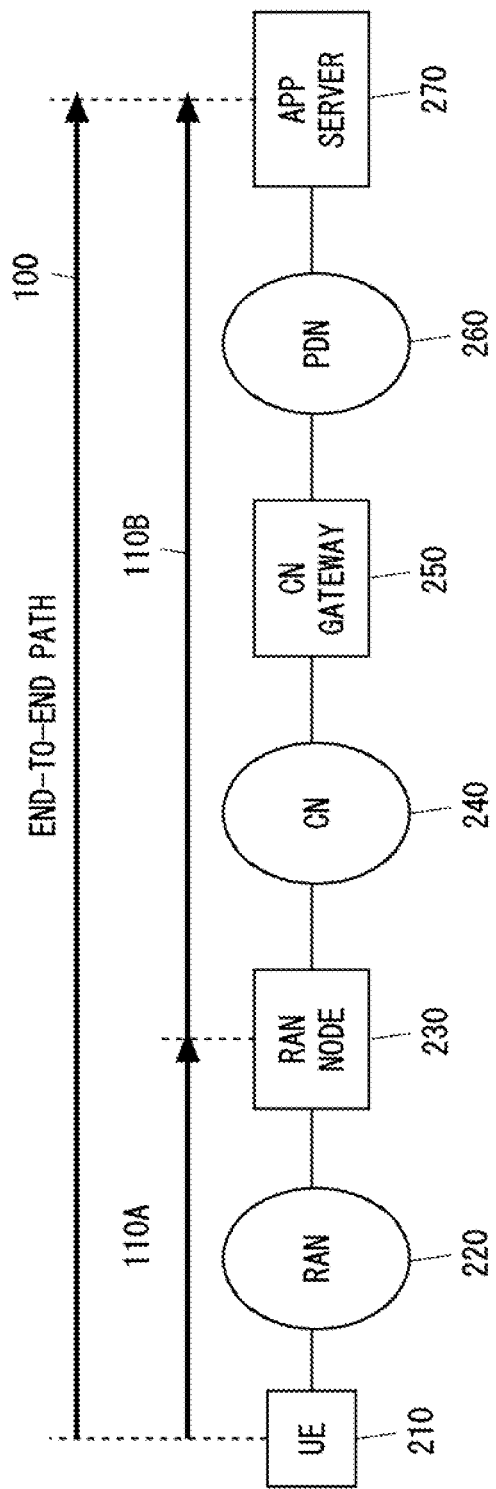
FIG. 2 shows an example of an end-to-end path.

The end-to-end path 100 shown in FIG. 2 is divided into two path segments 110A and 110B by a RAN node 230. The RAN node 230 corresponds to the intermediate node 20. The path segment 110A in FIG. 2 is a communication path from the UE 210 to the RAN node 230 through a RAN 220 (i.e., an uplink air interface). The path segment 110B in FIG. 2 is a communication path from the RAN node 230 to the application server 270. The path segment 110B in FIG. 2 passes through a core network 240, a core network (CN) gateway 250, and a Packet Data Network (PDN) 260. The core network 240 is for example an Evolved Packet Core (EPC) or a Universal Mobile Telecommunications System (UMTS) packet core, while the CN gateway 250 is for example a PDN Gateway (PGW) or a Gateway GPRS Support Node (GGSN).

Figure 3:
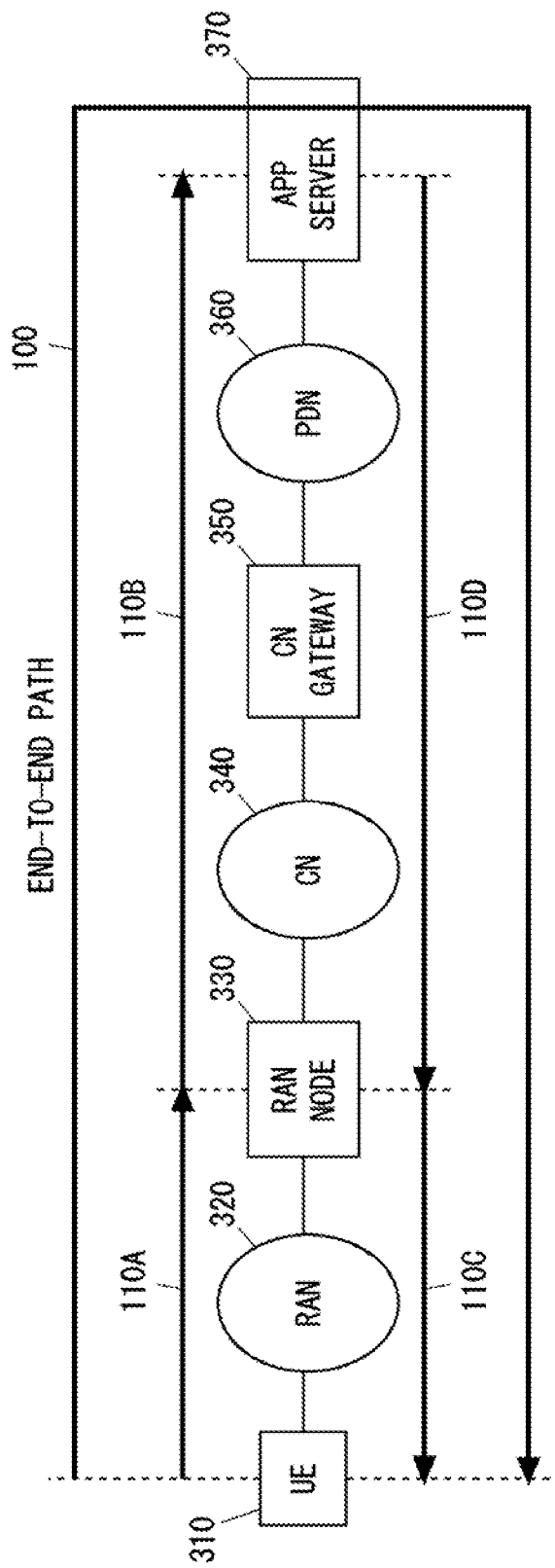
FIG. 3 shows an example of an end-to-end path.

In the example shown in FIG. 3, the end-to-end path 100 is a round-trip path that starts from a UE 310, passes through an application server 370, and returns to the UE 310. Accordingly, the UE 310 corresponds to both the (sender) end node 10 and the (receiver) end node 30.

The end-to-end path 100 shown in FIG. 3 is divided into four path segments 110A, 110B, 110C and 110D by a RAN node 330 and an application server 370. The path segment 110A in FIG. 3 is a communication path from a UE 310 to the RAN node 330 through a RAN 320 (i.e., an uplink air interface). The path segment 110B in FIG. 3 is a communication path from the RAN node 330 to the application server 370. The path segment 110C in FIG. 3 is a communication path from the application server 370 to the RAN node 330. The path segments 110B and 110C in FIG. 3 pass through a core network 340, a CN gateway 350, and a PDN 360. The path segment 110D in FIG. 3 is a communication path from the RAN node 330 to the UE 310 through the RAN 320 (i.e., a downlink air interface).

Figure 4:
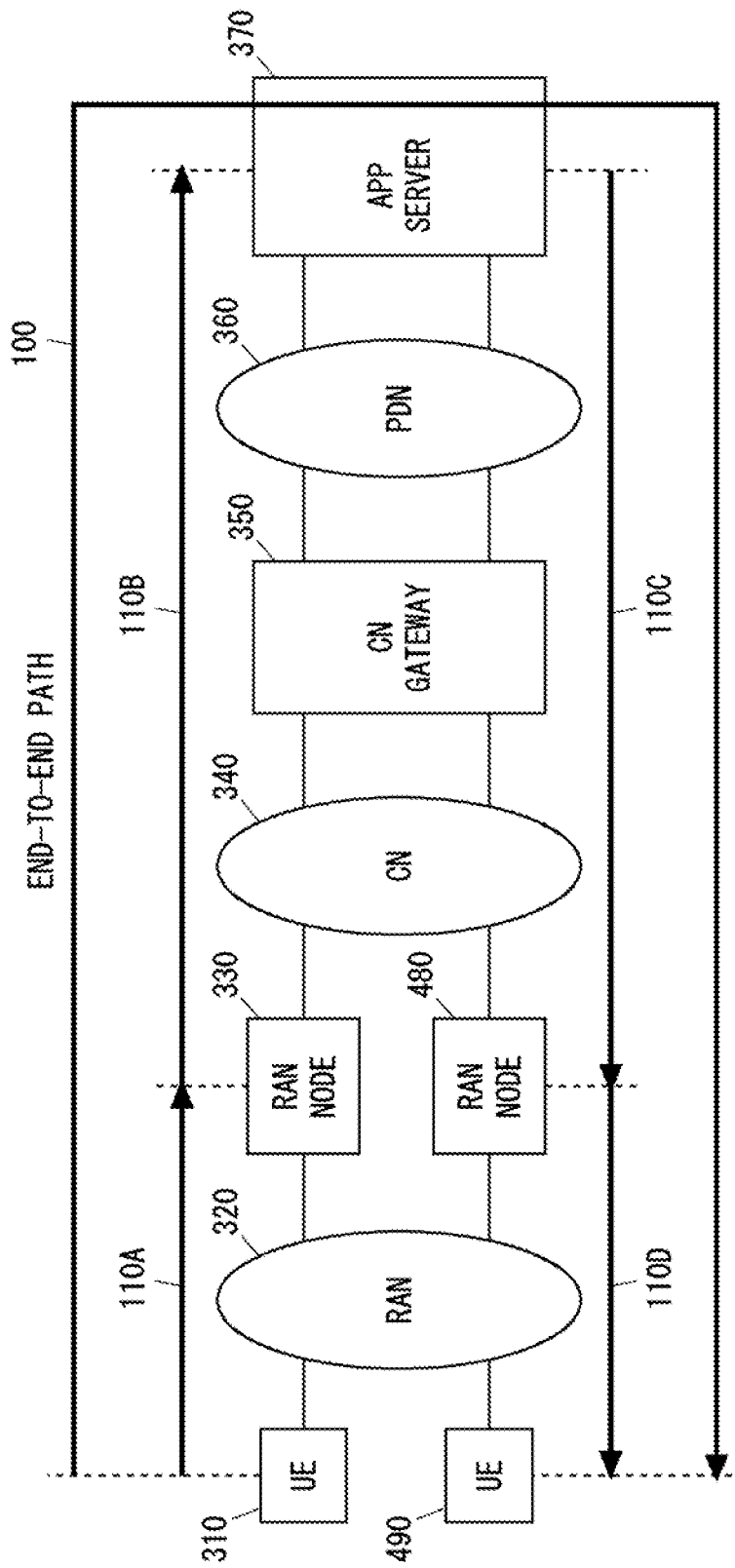
FIG. 4 shows an example of an end-to-end path.

The example shown in FIG. 4 is a modified example of the example shown in FIG. 3. That is, in the example shown in FIG. 4, the end-to-end path 100 starts from the UE 310, passes through the application server 370, and reaches a UE 490. Accordingly, the UE 310 corresponds to the (sender) end node 10 and the UE 490 corresponds to the (receiver) end node 30. The path segment 110C in FIG. 4 is a communication path from the application server 370 to a RAN node 480. The path segment 110D in FIG. 4 is a communication path from the RAN node 480 to the UE 490 through the RAN 320 (i.e., downlink air interface). The RAN node 480 may be identical to the RAN node 330.

Figure 5:
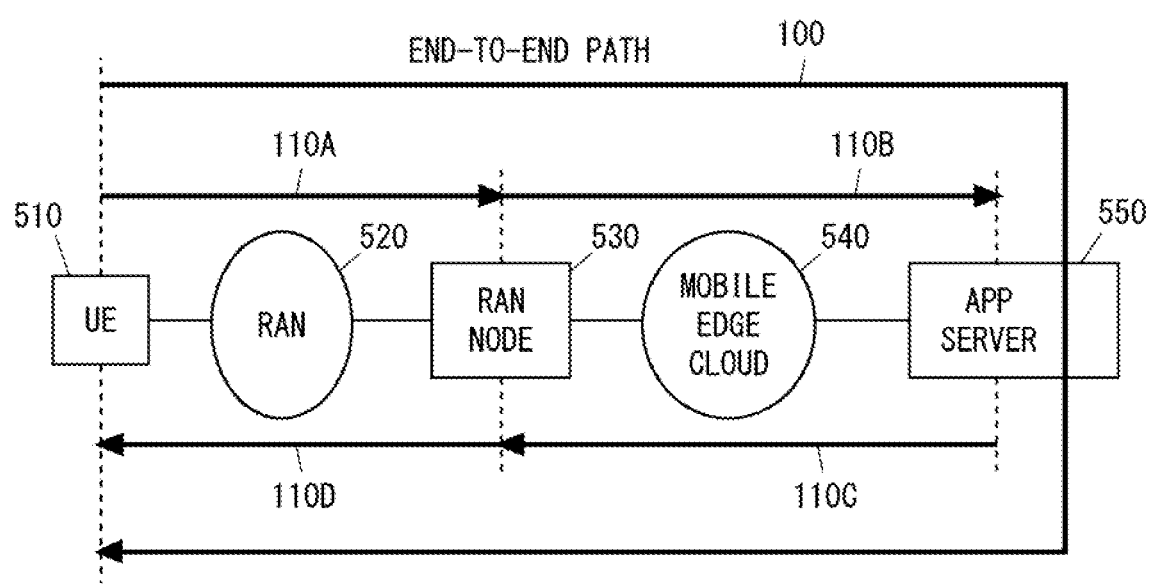
FIG. 5 shows an example of an end-to-end path.

The examples shown in FIG. 5 relates to Mobile Edge Computing (MEC). The MEC offers, to application developers and content providers, cloud-computing capabilities and an information technology (IT) service environment in the RAN in close proximity to mobile subscribers. This environment provides ultra-low latency and high bandwidth as well as direct access to radio network information (subscriber's location, cell load etc.) that can be leveraged by applications and services. The MEC is based on a virtualized platform, similar to Network Function Virtualization (NFV). While NFV focuses on network functions, MEC enables applications to be run at the edge of the network.

A mobile edge cloud 540 provides an application server 550 with computing resources, storage capacity, and an interface with a RAN. More specifically, the mobile edge cloud 540 provides a hosting environment for applications by providing Infrastructure as a Service (IaaS) facilities or Platform as a Service (PaaS) facilities. That is, the application server 550 may be an application (hereinafter referred to as an MEC application) hosted on a server (hereinafter referred to as an MEC server) in the mobile edge cloud 540. The mobile edge cloud 540 (or the MEC server) can also be referred to as an Internet of Things (IoT) service enabler.

The end-to-end path 100 shown in FIG. 5 is divided into four path segments 110A, 110B, 110C and 110D by a RAN node 530 and the application server 550. The path segment 110A in FIG. 5 is a communication path from a UE 510 to the RAN node 530 through a RAN 520 (i.e., an uplink air interface). The path segment 110B in FIG. 5 is a communication path from the RAN node 530 to the application server 550 arranged in the MEC environment. The path segment 110C in FIG. 5 is a communication path from the application server 55 to the RAN node 530. The path segments 110B and 110C in FIG. 5 pass through the mobile edge cloud 540. The path segment 110D in FIG. 5 is a communication path from the RAN node 530 to the UE 510 through the RAN 520 (i.e., a downlink air interface).

Referring back to FIG. 1, a controller 40 shown in FIG. 1 is a control apparatus configured to control a node in a communication network in order to achieve a target value (or setpoint) of QoS performance required by a traffic flow transferred through the communication network. In order to control each path segment 110, the controller 40 communicates with at least one node included in the path segment 110 or communicates with an entity that manages the path segment 110. For example, the controller 40 may communicate with the RAN node 230 to control the path segment 110A (i.e., a RAN segment) shown in FIG. 2. The controller 40 may communicate with at least one of the RAN node 230, the CN gateway 250, and the application server 270, to control the path segment 110B (i.e., a wired network segment) shown in FIG. 2. Additionally or alternatively, the controller 40 may communicate with a control entity (e.g., a Service Capability Exposure Function (SCEF) or a Policy and Charging Rules Function (PCRF)) in the core network 240 to control the path segment 110B shown in FIG. 2. That is, although respective connection relations between the controller 40 and the four nodes 10, 20A, 20B and 30 included in the end-to-end path 100 are shown in FIG. 1, the controller 40 may communicate only with some of these four nodes.

The controller 40 may be a single computer system or may be (distributed) computer systems. In some implementations, the controller 40 may be arranged in a core network (e.g., the core network 240 or 340) or may be arranged in a PDN (e.g., the PDN 260 or 360). For example, the controller 40 may be arranged in a control node (e.g., an SCEF) within the core network. In some implementations, the controller 40 may be arranged in the mobile edge cloud 540 (e.g., an MEC server or an IoT service enabler) shown in FIG. 5. In some implementations, the controller 40 may be arranged in one of the nodes included in the end-to-end path 100 (e.g., the end node 10, one of the intermediate nodes 20, or the end node 30).

The controller 40 determines a control value to be supplied to a node in a communication network (e.g., the end node 10, one of the intermediate nodes 20, or the end node 30), so as to achieve a target value (or setpoint) of Quality of Service (QoS) performance required by a traffic flow transferred through the communication network.

The setpoint of the QoS performance may be, for example, end-to-end latency between the sender end node 10 and the receiver end node 30 of the traffic flow, target throughput of the traffic flow, or an acceptable delay for the communication network.

The control value causes the node to adjust allocation of network resources to the traffic flow. The control value may be, for example, guaranteed QoS for the traffic flow. More specifically, the control value may be at least one of a priority, a guaranteed delay, and a guaranteed bit rate. The control value can also be referred to as a network control policy.

In some implementations, the controller 40 may perform feedback control as described below. The controller 40 acquires a measured value of the QoS performance regarding the traffic flow transferred through the communication network and compares the measured value with the setpoint of the QoS performance. Then, the controller 40 determines a control value to be supplied to the node in the communication network in such a manner that the setpoint is achieved.

Further, the controller 40 monitors a traffic-related parameter regarding the traffic flow. The traffic-related parameter affects the determination of the control value for achieving the setpoint of the QoS performance. The traffic-related parameter may be, for example, the size of data to be sent in one communication event that the end-to-end latency is guaranteed. Additionally or alternatively, the traffic-related parameter may include at least one of a data rate per communication event and an interval between communications in one communication event. The traffic-related parameter may be another parameter that relates to the pattern of the traffic flow and changes as the transmission data size or the data rate per communication event changes.

In some implementations, the controller 40 may acquire a configured or measured value of the traffic-related parameter from the end node 10 or 30. Additionally or alternatively, the controller 40 may acquire a measured value of the traffic-related parameter from at least one intermediate node 20 that takes part in the transfer of the traffic flow. Additionally or alternatively, the controller 40 may acquire a configured or measured value of the traffic-related parameter from another control entity.

In addition, the controller 40 acquires a control delay between the controller 40 and the node. In some implementations, the control delay may be a predetermined constant value. In this case, the controller 40 may read and use a value of the control delay stored in a memory, or may receive a value of the control delay from another node. However, the control delay may vary depending on one or both of the load on the controller 40 and the load on the node that operates in accordance with the control value received from the controller 40. Further, the control delay may vary depending on the variation in the transfer delay in a network between the controller 40 and the node. Further, the control delay may vary depending on the number of terminals connected to the node. Accordingly, in some implementations, the controller 40 may measure the control delay. For example, the controller 40 may transmit to the node a packet containing a time stamp indicative of the time of transmission. The node may then acquire a time stamp upon receiving this packet, and estimate a one-way delay time based on the difference between the two time stamps. The controller 40 may receive the estimated one-way delay time from the node.

Further, the controller 40 corrects the control value to be supplied to the node, on the basis of the control delay and on the basis of a trend in changes in the traffic-related parameter. Specifically, the controller 40 may correct the control value in such a manner that the control value is consistent with an estimated value of the traffic-related parameter at a point in time in the future when the node operates in accordance with the control value. In other words, the controller 40 may treat the control delay and the change (or variation) in the flow-related parameter (e.g., the data size per communication event) as disturbances to the feedback control. The controller 40 may perform feedforward control to compensate for the control delay and the change in the flow-related parameter.

In some implementations, the controller 40 may estimate the trend in changes in the traffic-related parameter from (a time series of) measured values of it and also estimate (or predict) a future value of the traffic-related parameter at a point in time in the future when the node operates in accordance with the control value. Then, the controller 40 may correct the control value in such a manner that the control value is consistent with the estimated future value of the traffic-related parameter.

Figure 6:
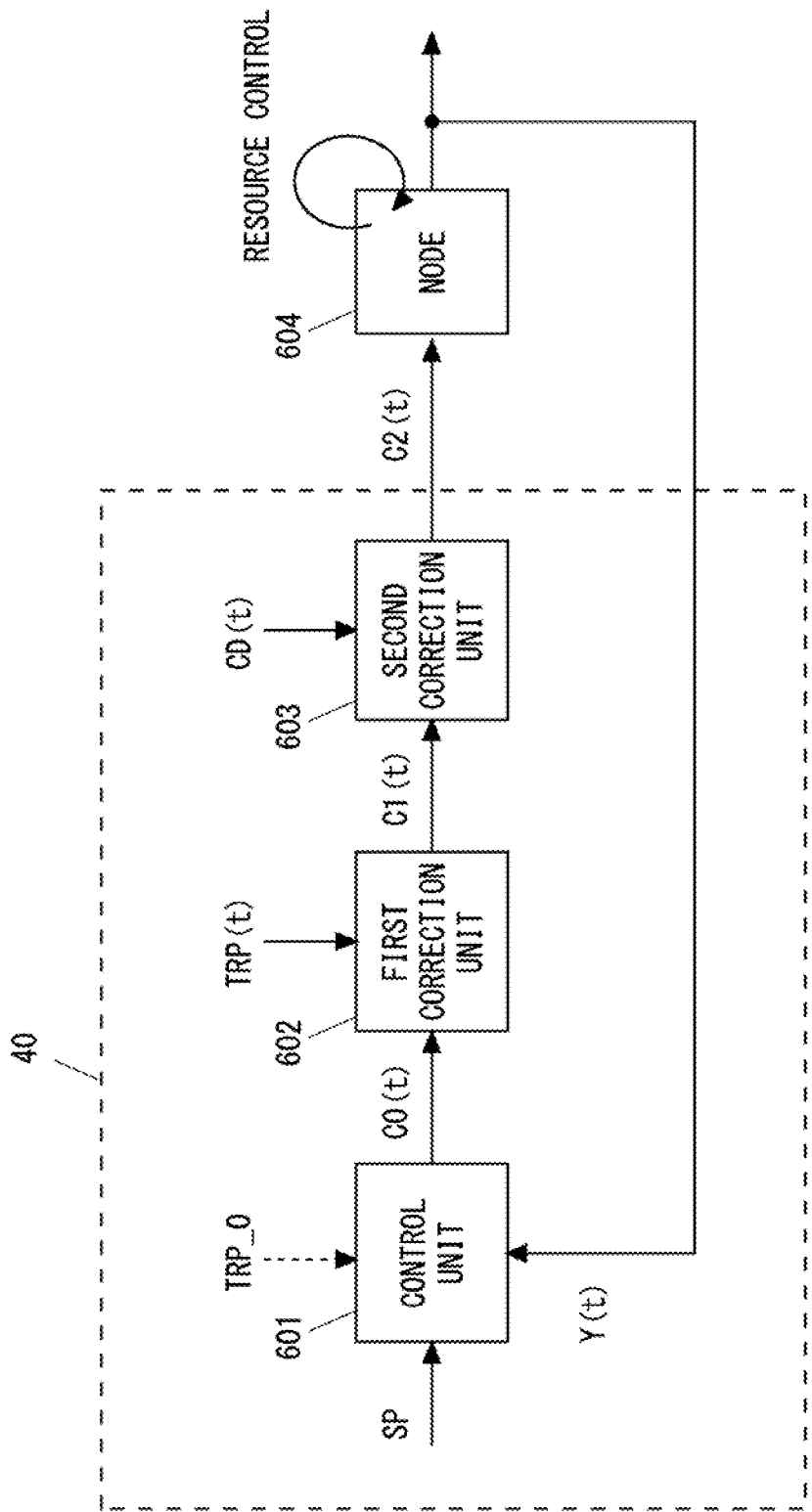
FIG. 6 is a block diagram showing an example of control performed by a control apparatus according to the first embodiment.
Figure 7:
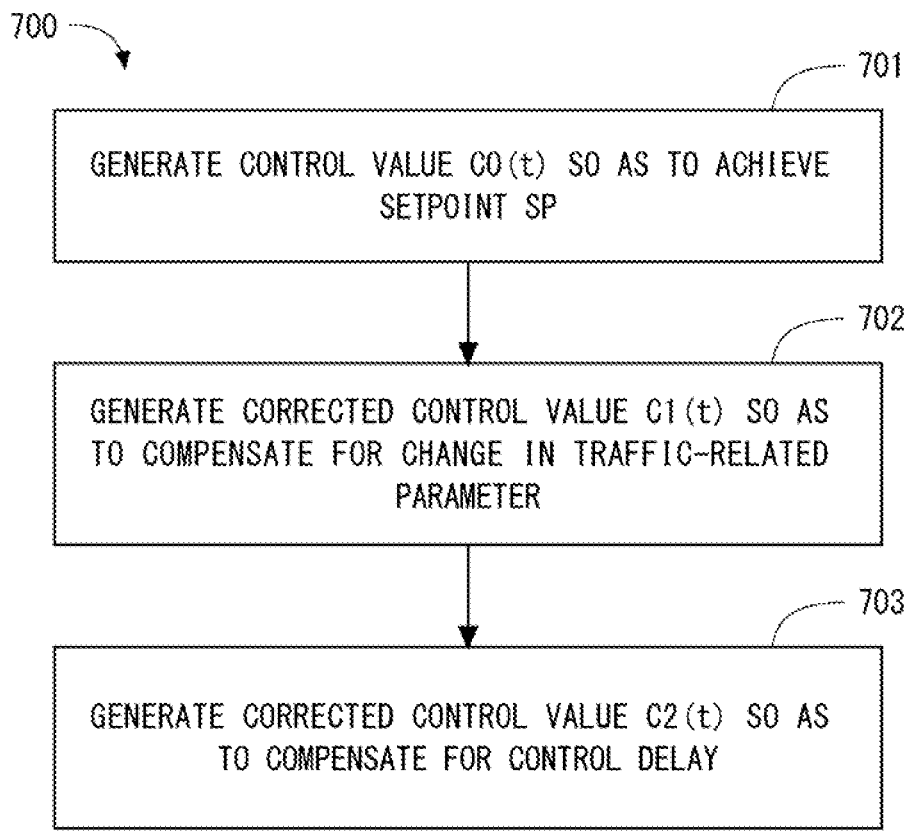
FIG. 7 is a flowchart showing an example of operations performed by a control apparatus according to the first embodiment.

The following describes operations performed by the controller 40 in more detail with reference to FIGS. 6 and 7. FIG. 6 is a block diagram showing an example of the control for achieving the QoS setpoint performed by the controller 40. FIG. 7 is a flowchart showing a process 700 that is an example of the operations performed by the controller 40.

In the example shown in FIG. 6, the controller 40 includes a control unit 601, a first correction unit 602, and a second correction unit 603. The control unit 601 compares a measured value Y(t) of the QoS performance with the setpoint SP thereof and thus generates a control value C0($t$) so as to achieve the setpoint SP. For example, in order to derive the control value C0($t$) from the setpoint SP (e.g., the end-to-end latency), the initial value TRP_0 of the traffic-related parameter (e.g., the size of transmission data per communication event) may be taken into consideration. Step 701 in FIG. 7 corresponds to the processing performed in the control unit 601.

The first correction unit 602 receives a latest value TRP(t) of the traffic-related parameter, corrects the control value C0($t$) so as to compensate for a temporal change in the traffic-related parameter, and thus generates a first corrected control value C1($t$). The first correction unit 602 may correct the control value C0($t$) based on the difference between the detected value TRP(t) of the traffic-related parameter and its initial value (i.e., reference value) TRP_0. Step 702 in FIG. 7 corresponds to the processing performed in the first correction unit 602.

The second correcting unit 603 further corrects the first corrected control value C1($t$) so as to compensate for a latest value CD(t) of the control delay, and thus generates a second corrected control value C2($t$). As described above, the control delay may be a constant value. Step 703 in FIG. 7 corresponds to the processing performed in the second correction unit 603.

A node 604 receives the second corrected control value C2($t$) from the controller 40 and adjusts allocation of network resources to the traffic flow in accordance with the received control value. The control over the allocation of network resources may be, for example, scheduling of radio resources performed by a RAN node (e.g., eNB or RNC). For example, the RAN node may receive an acceptable delay as the control value and perform scheduling of radio resources to satisfy the acceptable delay.

The first correction unit 602 may receive the traffic-related parameter a plurality of times. Further, the first and second correction units 602 and 603 may generate the first and second corrected control values C1($t$) and C2($t$) based on the number of times of the reception. Each of the first and second correction units 602 and 603 may generate a control value related to either of an input delay and an output delay.

For example, the RAN node includes a MAC scheduler that performs packet scheduling (i.e., Medium Access Control (MAC) scheduling). In some implementations, the MAC scheduler uses a scheduling metric based on the Earliest Deadline First (EDF) approach (i.e., EDF metric). The EDF metric is in proportion to the reciprocal of the difference between the delay threshold and the head of line delay. The head of line delay means a delay of the first packet of user's pending packets to be transmitted. The RAN node may receive an acceptable delay as the control value and change the delay threshold used for the calculation of the EDF metric for a packet flow related to the traffic flow or another packet flow in such a manner that the received acceptable delay is achieved.

Additionally or alternatively, the control over the allocation of network resources may be control of communication bandwidth performed by a RAN node (e.g., eNB or RNC), a gateway (e.g., PGW or SGSN), or another user-plane node that takes part in the transfer of the traffic flow.

The gateway (e.g., PGW or SGSN) and an IP router may control the treatment (e.g., priority) of one or both of classification and scheduling for a packet flow related to the traffic flow or another packet flow, so as to achieve the control value (e.g., the guaranteed bit rate). In some implementations, the gateway and the IP router may change a class of the packet flow related to the traffic flow in order to increase the priority of this packet flow. Additionally or alternatively, the gateway and the IP router may change a Weight Fair Queuing (WFQ) weight applied to a queue that the packet flow related to the traffic flow is to be stored in.

As understood from the above description, the controller 40 according to this embodiment is configured to correct the control value to be supplied to the node based on the control delay and on a trend in changes in the traffic-related parameter. The controller 40 according to this embodiment thus can contribute to stabilizing the control for guaranteeing the QoS performance required by the traffic flow transferred through the communication network even when there is a non-negligible control delay.

Second Embodiment

This embodiment provides a modified example of the control performed by the controller 40 described in the first embodiment. Configuration examples of a communication network according to this embodiment are similar to those shown in FIGS. 1 to 5.

The controller 40 according to this embodiment performs the second correction based on the control delay (i.e., the correction performed by the second correction unit 603 in Step 703 of FIG. 7) as follows. The controller 40 monitors changes in the control delay and generates the second corrected control value C2($t$) while taking into account the changes in the control delay. As already described, the control delay may vary depending on one or both of the load on the controller 40 and the load on the node that operates in accordance with the control value received from the controller 40. Further, the control delay may vary depending on the variation in the transfer delay in the network between the controller 40 and the node. Further, the control delay may vary depending on the number of terminals connected to the node. The controller 40 according to this embodiment compensates for the variation in the control delay. The controller 40 according to this embodiment thus can contribute to stabilizing the control for guaranteeing the QoS performance required by the traffic flow transferred through the communication network even when there are variations in the control delay.

Figure 8:
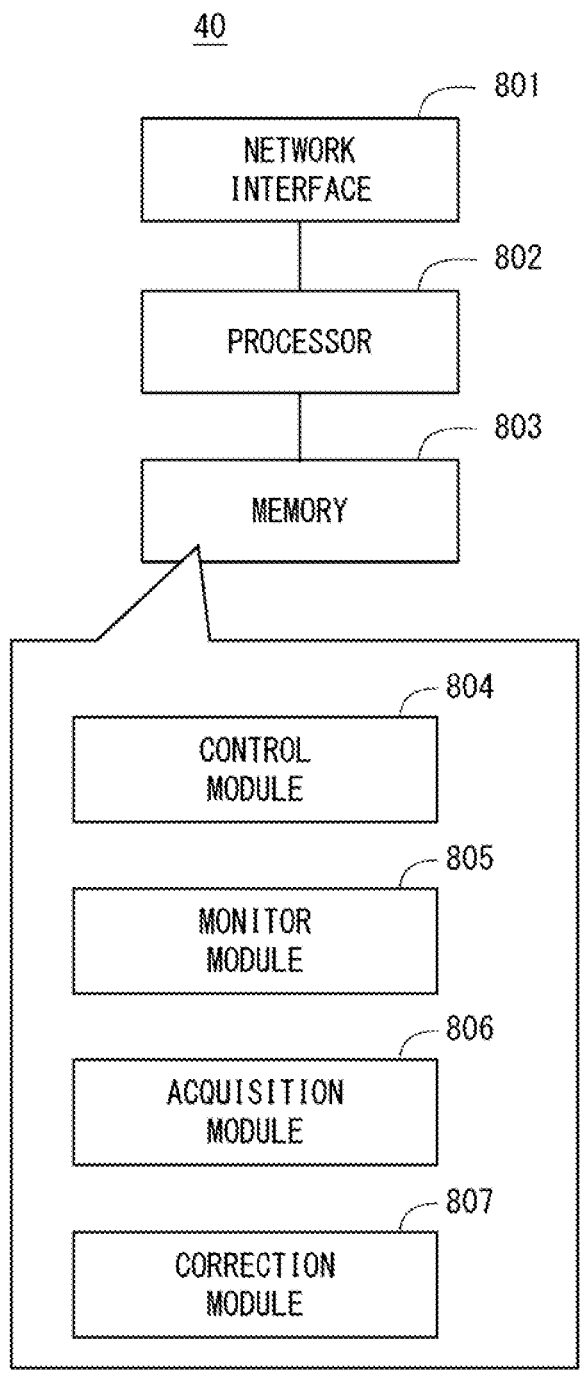
FIG. 8 is a block diagram showing a configuration example of a control apparatus.

Lastly, a configuration example of the controller 40 according to the above embodiments will be described. FIG. 8 is a block diagram showing a configuration example of the controller 40. Referring to FIG. 8, the controller 40 includes a network interface 801, a processor 802, and a memory 803. The network interface 801 is used to communicate with network entities (e.g., end nodes, intermediate nodes, a UE, a RAN node, a CN node, and an application server). The network interface 801 may include, for example, a network interface card (NIC) conforming to the IEEE 802.3 series.

The processor 802 loads software (computer program(s)) from the memory 803 and executes the loaded software, thereby performing processing of the controller 40 described in the above embodiments. The processor 802 may be, for example, a microprocessor, an MPU, or a CPU. The processor 802 may include a plurality of processors.

The memory 803 is composed of a volatile memory and a nonvolatile memory. The memory 803 may include a storage located apart from the processor 802. In this case, the processor 802 may access the memory 803 through an I/O interface (not shown).

In the example shown in FIG. 8, the memory 803 is used to store software modules including a control module 804, a monitoring module 805, an acquisition module 806, and a correction module 807. The processor 802 loads the software modules from the memory 803 and executes the loaded software modules, thereby performing the processing of the controller 40 described by in the above embodiments.

The processor 802 can load and execute the control module 804, thereby performing, for example, processing of the control unit 601 in FIG. 6 (or processing in Step 701 in FIG. 7). The processor 802 can load and execute the monitoring module 805, thereby monitoring a traffic-related parameter and detecting a change in the traffic-related parameter. The processor 802 can load and execute the correction module 807, thereby performing, for example, processing of the first and second correction units 602 and 603 in FIG. 6 (or processing in Steps 702 and 703 in FIG. 7).

As described above with reference to FIG. 8, the processor included in the controller 40 in the above embodiment may be configured to execute one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

Each of the above embodiments may be used individually, or two or more of the embodiments may be appropriately combined with one another.

Further, the above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note 1)

A control apparatus comprising:

a memory; and at least one processor coupled to the memory and configured to execute a plurality of modules, wherein the plurality of modules comprises:

a control module configured to determine a control value to be supplied to a node in a communication network so as to achieve a setpoint of Quality of Service (QoS) performance required by a traffic flow transferred through the communication network, the control value causing the node to adjust allocation of network resources to the traffic flow;

a monitoring module configured to monitor a traffic-related parameter regarding the traffic flow;

an acquisition module configured to acquire a control delay between the control apparatus and the node; and a correction module configured to correct the control value based on the control delay and on a trend in changes in the traffic-related parameter.

(Supplementary Note 2)

The control apparatus described in Supplementary note 1, wherein the correction module is configured to correct the control value in such a manner that the control value is consistent with an estimated value of the traffic-related parameter at a point in time in the future when the node operates in accordance with the control value.

(Supplementary Note 3)

The control apparatus described in Supplementary note 1 or 2, wherein the correction module comprises:

a first correction module configured to generate a first corrected control value by correcting the control value based on a latest value of the traffic-related parameter; and a second correction module configured to generate a second corrected control value by correcting the first corrected control value based on the control delay.

(Supplementary Note 4)

The control apparatus described in Supplementary note 3, wherein the second corrected control value is consistent with an estimated value of the traffic-related parameter at a point in time in the future when the node operates in accordance with the control value.

(Supplementary Note 5)

The control apparatus described in Supplementary note 3 or 4, wherein the acquisition module is configured to monitor a change in the control delay, and the correction module is configured to generate the second corrected control value while taking into account the change in the control delay.

(Supplementary Note 6)

The control apparatus described in any one of Supplementary notes 1 to 5, wherein the traffic-related parameter is a parameter that affects the determination of the control value for achieving the setpoint.

(Supplementary Note 7)

The control apparatus described in any one of Supplementary notes 1 to 6, wherein the traffic-related parameter relates to at least one of a data size per communication event, a data rate of a communication event, and an interval between communications in the communication event.

(Supplementary Note 8)

The control apparatus described in any one of Supplementary notes 1 to 7, wherein the setpoint is end-to-end latency between a sender end node and a receiver end node of the traffic flow, target throughput of the traffic flow, or an acceptable delay for the communication network.

(Supplementary Note 9)

The control apparatus described in any one of Supplementary notes 1 to 8, wherein the control value is guaranteed Quality of service (QoS) for the traffic flow.

(Supplementary Note 10)

The control apparatus described in Supplementary note 9, wherein the guaranteed Quality of service (QoS) includes at least one of a priority, a guaranteed delay, and a guaranteed bit rate.

(Supplementary Note 11)

The control apparatus described in any one of Supplementary notes 1 to 10, wherein the node includes at least one of a radio access network node in the communication network and a core network node in the communication network.

(Supplementary Note 12)

A method performed by a control apparatus, the method comprising:

determining a control value to be supplied to a node in a communication network so as to achieve a setpoint of Quality of Service (QoS) performance required by a traffic flow transferred through the communication network, the control value causing the node to adjust allocation of network resources to the traffic flow;

monitoring a traffic-related parameter regarding the traffic flow;

acquiring a control delay between the control apparatus and the node; and correcting the control value based on the control delay and on a trend in changes in the traffic-related parameter.

(Supplementary Note 13)

The method described in Supplementary note 12, wherein the correcting comprises correcting the control value in such a manner that the control value is consistent with an estimated value of the traffic-related parameter at a point in time in the future when the node operates in accordance with the control value.

(Supplementary Note 14)

The method described in Supplementary note 12 or 13, wherein the correcting comprises:

generating a first corrected control value by correcting the control value based on a latest value of the traffic-related parameter; and generating a second corrected control value by correcting the first corrected control value based on the control delay.

(Supplementary Note 15)

The method described in Supplementary note 14, wherein the second corrected control value is consistent with an estimated value of the traffic-related parameter at a point in time in the future when the node operates in accordance with the control value.

(Supplementary Note 16)

The method described in Supplementary note 14 or 15, wherein the acquiring comprises monitoring a change in the control delay, and the generating the second corrected control value comprises determining the second corrected control value while taking into account the change in the control delay.

(Supplementary Note 17)

The method described in any one of Supplementary notes 12 to 16, wherein the traffic-related parameter is a parameter that affects the determination of the control value for achieving the setpoint.

(Supplementary Note 18)

The method described in any one of Supplementary notes 12 to 17, wherein the traffic-related parameter relates to at least one of a data size per communication event, a data rate of a communication event, and an interval between communications in the communication event.

(Supplementary Note 19)

The method described in any one of Supplementary notes 12 to 18, wherein the setpoint is end-to-end latency between a sender end node and a receiver end node of the traffic flow, target throughput of the traffic flow, or an acceptable delay for the communication network.

(Supplementary Note 20)

The method described in any one of Supplementary notes 12 to 19, wherein the control value is guaranteed Quality of service (QoS) for the traffic flow.

(Supplementary Note 21)

The method described in Supplementary note 20, wherein the guaranteed Quality of service (QoS) includes at least one of a priority, a guaranteed delay, and a guaranteed bit rate.

(Supplementary Note 22)

The method described in any one of Supplementary notes 12 to 21, wherein the node includes at least one of a radio access network node in the communication network and a core network node in the communication network.

(Supplementary Note 23)

A program for causing a computer to perform a method performed by a control apparatus, the method comprising:

determining a control value to be supplied to a node in a communication network so as to achieve a setpoint of Quality of Service (QoS) performance required by a traffic flow transferred through the communication network, the control value causing the node to adjust allocation of network resources to the traffic flow;

monitoring a traffic-related parameter regarding the traffic flow;

acquiring a control delay between the control apparatus and the node; and correcting the control value based on the control delay and on a trend in changes in the traffic-related parameter.

REFERENCE SIGNS LIST

10 END NODE
20 INTERMEDIATE NODE
30 END NODE
40 CONTROLLER
802 PROCESSOR
803 MEMORY
804 CONTROL MODULE
805 MONITORING MODULE
806 ACQUISITION MODULE
807 CORRECTION MODULE

What is claimed is:

1. A control apparatus comprising:
at least one processor configured to:
acquire a measured value of Quality of Service (QoS) performance regarding a traffic flow through a communication network;
compare the measured value with a desired value of the QoS performance;
generate a control value to be supplied to a node in the communication network in such a manner that the desired value of the QoS performance is achieved; and
correct the control value based on a trend in changes in a traffic-related parameter regarding the traffic flow and based on a control delay between the control apparatus and the node.

2. The control apparatus according to claim 1, wherein the trend in changes includes a temporal change.

3. The control apparatus according to claim 1, wherein the control apparatus is installed in a server.

4. The control apparatus according to claim 1, wherein the control apparatus is installed in a Mobile Edge Computing (MEC) server.

5. The control apparatus according to claim 1, wherein the traffic-related parameter includes at least one of a size of data to be sent in a first communication event, a data rate in a second communication event, and an interval between a third communication event and a fourth communication event.

6. The control apparatus according to claim 1, wherein the desired value of the QoS performance includes at least one of end-to-end latency between a sender end node and a receiver end node of the traffic flow, target throughput of the traffic flow, and an acceptable delay for the communication network.

7. A method for a control apparatus comprising:
acquiring a measured value of Quality of Service (QoS) performance regarding a traffic flow through a communication network;
comparing the measured value with a desired value of the QoS performance;
generating a control value to be supplied to a node in the communication network in such a manner that the desired value of the QoS performance is achieved; and
correcting the control value based on a trend in changes in a traffic-related parameter regarding the traffic flow and based on a control delay between the control apparatus and the node.

8. The method according to claim 7, wherein the trend in changes includes a temporal change.

9. The method according to claim 7, wherein the control apparatus is installed in a server.

10. The method according to claim 7, wherein the control apparatus is installed in a Mobile Edge Computing (MEC) server.

11. The method according to claim 7, wherein the traffic-related parameter includes at least one of a size of data to be sent in a first communication event, a data rate in a second communication event, and an interval between a third communication event and a fourth communication event.

12. The method according to claim 7, wherein the desired value of the QoS performance includes at least one of end-to-end latency between a sender end node and a receiver end node of the traffic flow, target throughput of the traffic flow, and an acceptable delay for the communication network.

13. The control apparatus of claim 1,
wherein the communication network comprises a sender end node at which an end-to-end path starts and a receiver end node at which the end-to-end path ends,
the traffic flow transferred through the communication network flows from the sender end node to the receiver end node, and
the traffic-related parameter is observable at the sender end node independently of other traffic flowing in the communication network.

14. The control apparatus of claim 1,
wherein the communication network comprises a sender end node at which an end-to-end path starts and a receiver end node at which the end-to-end path ends,
the traffic flow transferred through the communication network flows from the sender end node to the receiver end node, and
the traffic-related parameter corresponds to: i) a first change in an image resolution of a first image communicated by the sender end node to the receiver end node, or ii) a second change in a number of feature points extracted from a second image at the sender end node, wherein the second image is to be transmitted to the receiver end node.

15. The control apparatus of claim 1,
wherein the communication network comprises a sender end node at which an end-to-end path starts and a receiver end node at which the end-to-end path ends,
the traffic flow transferred through the communication network flows from the sender end node to the receiver end node, and
the traffic-related parameter corresponds to: i) a size of data to be sent in one communication event, or ii) an interval between communications in a communication event.

16. The control apparatus of claim 1, wherein the at least one processor is further configured to transmit the corrected control value to a receiver end node for adjustment of allocation of network resources at the receiver end node, wherein the network resources are associated with the traffic flow.

* * * * *